United States Patent
Kim et al.

(10) Patent No.: US 10,125,861 B2
(45) Date of Patent: Nov. 13, 2018

(54) METHOD AND APPARATUS FOR CONTROLLING TRANSMISSION OF VEHICLE

(71) Applicant: HYUNDAI AUTRON CO., LTD., Seongnam-si (KR)

(72) Inventors: Min-Hyo Kim, Seongnam-si (KR); Woo-Sik Yoon, Seongnam-si (KR); Hyun-Soo Kim, Seoul (KR); Han-Ho Son, Seoul (KR); Gyeong-Hwi Min, Seoul (KR)

(73) Assignee: HYUNDAI AUTRON CO., LTD., Seongnam-si (KR)

( * ) Notice: Subject to any disclaimer, the term of this patent is extended or adjusted under 35 U.S.C. 154(b) by 532 days.

(21) Appl. No.: 14/961,284

(22) Filed: Dec. 7, 2015

(65) Prior Publication Data
US 2016/0169377 A1  Jun. 16, 2016

(30) Foreign Application Priority Data
Dec. 15, 2014 (KR) .................. 10-2014-0180623

(51) Int. Cl.
*F16H 61/04* (2006.01)
(52) U.S. Cl.
CPC ..... *F16H 61/0403* (2013.01); *F16H 2306/54* (2013.01)
(58) Field of Classification Search
CPC ... F16H 61/04; F16H 61/0403; F16H 2306/54
See application file for complete search history.

(56) References Cited

U.S. PATENT DOCUMENTS

2002/0043119 A1  4/2002 Miyazaki et al.
2008/0255739 A1* 10/2008 Murayama ............ F02D 31/001
                                                    701/54
(Continued)

FOREIGN PATENT DOCUMENTS

DE  10 2005 054 623 A1  6/2003
JP     2000-046176 A     2/2000
(Continued)

OTHER PUBLICATIONS

Harald Naunheimer, Bernd Bertsche & Gisbert Lechner, Fahrzeug-getriebe: Grundlagen, Auswahl, Auslegung und Konstruktion, Berlin: Springer, 2007.S.302-373, ISBN 978-3-540-30625-2.

*Primary Examiner* — Huan Le
(74) *Attorney, Agent, or Firm* — Baker McKenzie; Hyunho Park

(57) ABSTRACT

The present invention relates to a method and apparatus for controlling a transmission of a vehicle and, more particularly, to a method and apparatus for controlling synchronization of a synchronizer included in a transmission. The method includes determining a speed change mode of a vehicle and a target time corresponding to the speed change mode; calculating a difference in speed between an input shaft and an output shaft with respect to a current time; calculating a speed increment or decrement of the output shaft from the current time to the target time; calculating a synchronization torque using the difference in speed and the speed increment or decrement; determining a target displacement of a synchronizer using the synchronization torque; and controlling the synchronizer according to the target displacement and recognizing a sleeve with a clutch gear.

10 Claims, 4 Drawing Sheets

(56) References Cited

U.S. PATENT DOCUMENTS

| | | | | |
|---|---|---|---|---|
| 2010/0113217 A1* | 5/2010 | Terwart | ............... | F16H 61/0403 |
| | | | | 477/79 |
| 2013/0073154 A1* | 3/2013 | Tanaka | .................... | F16D 48/06 |
| | | | | 701/54 |
| 2013/0289839 A1* | 10/2013 | Iizuka | ................. | F16H 61/0437 |
| | | | | 701/54 |

FOREIGN PATENT DOCUMENTS

| JP | 2002-071017 A | 3/2002 |
|---|---|---|
| KR | 10-2007-0009451 A | 1/2007 |
| KR | 10-2012-0008203 A | 1/2012 |

\* cited by examiner

METHOD AND APPARATUS FOR CONTROLLING TRANSMISSION OF VEHICLE

CROSS REFERENCE TO RELATED APPLICATION

This application claims the benefit of Korean Patent Application No. 10-2014-0180623, filed on Dec. 15, 2014, entitled "METHOD AND APPARATUS FOR CONTROLLING TRANSMISSION OF VEHICLE", which is hereby incorporated by reference in its entirety into this application.

BACKGROUND

1. Technical Field

The present invention relates to a method and apparatus for controlling a transmission of a vehicle and, more particularly, to a method and apparatus for controlling synchronization of a synchronizer included in a transmission.

2. Description of the Related Art

Generally, power generated from an engine is transferred via a transmission and finally output through wheels with changed revolutions per minute and torque. Transmissions are broadly divided into manual transmissions and automatic transmissions. In the case of a manual transmission, when the driver moves the gearshift to a desired gear step, the shift fork connected with a cable moves a sleeve and engages the same with a desired clutch gear, thereby changing the speed. The manual transmission requires the driver to participate in every operation for changing the speed according to the driving condition, and therefore causing inconvenience to the driver with operations such as manipulation of the clutch.

To address the aforementioned problem, automatic transmissions have recently been widely applied to vehicles. With the automatic transmission, a transmission control unit automatically performs shift to a target gear step according to the driving conditions (the vehicle speed, the degree of opening of the throttle, etc.) of the vehicle. Since the automatic transmission does not require the driver to take a special action to change the speed, it provides convenient driving. However, the automatic transmission causes problems such as degradation of fuel efficiency and power performance.

Recently, an automated manual transmission combining the advantages of the manual transmission and the automatic transmission have been commercialized. With the automated manual transmission, the shift fork is moved with a shift motor connected to an electronic device such as a transmission control unit, rather than being moved by the gearshift connected thereto via a cable.

Such a transmission employs a synchronizer to guide smooth synchronization between the clutch and the gears in changing the speed. The synchronizer, which is intended to guide smooth engagement between gears in changing the speed of the vehicle, synchronizes the rotation speed of the sleeve with the rotation speed of the clutch gear. If a synchronization torque for controlling the synchronizer is excessively high, shock is generated due to inertia of the gears and thus the driving quality is lowered when the speed of the vehicle is changed. If the synchronization torque for controlling the synchronizer is excessively low, the sleeve may fail to engage with the clutch gear.

Accordingly, to accurately perform change of the speed while minimizing shock according to change of the speed, there is a need for a method to determine a proper synchronization torque applied to the synchronizer and more accurately control the synchronizer based on the determined synchronization torque.

SUMMARY

It is an object of the present invention to provide a transmission control method and apparatus for more accurately and smoothly perform speed change by controlling a synchronizer through calculation of an optimum control position according to the real driving situation in driving the vehicle and performing feedback calibration according to a control error.

It should be noted that objects of the present invention are not limited to the aforementioned object, and other objects of the present invention will be apparent to those skilled in the art from the following descriptions. The objectives and advantages of the invention may be realized and attained by elements recited in the claims and a combination thereof.

In accordance with one aspect of the present invention, a method for controlling a transmission includes determining a speed change mode of a vehicle and a target time corresponding to the speed change mode; calculating a difference in speed between an input shaft and an output shaft with respect to a current time; calculating a speed increment or decrement of the output shaft from the current time to the target time; calculating a synchronization torque using the difference in speed and the speed increment or decrement; determining a target displacement of a synchronizer using the synchronization torque; and controlling the synchronizer according to the target displacement and recognizing a sleeve with a clutch gear.

In accordance with another aspect of the present invention, an apparatus for controlling a transmission includes a calculator configured to determine a speed change mode of a vehicle and a target time corresponding to the speed change mode, calculate a difference in speed between an input shaft and an output shaft with respect to a current time, calculate a speed increment or decrement of the output shaft from the current time to the target time, and calculate a synchronization torque using the difference in speed and the speed increment or decrement; and a controller configured to determine a target displacement of a synchronizer using the synchronization torque, and control the synchronizer according to the target displacement and recognizing a sleeve with a clutch gear.

According to the present invention described above, speed of the vehicle may be more accurately and smoothly changed by controlling a synchronizer through calculation of an optimum control position according to the real driving situation in driving the vehicle and performing feedback calibration according to a control error.

DETAILED DESCRIPTION

The aforementioned advantages, objects, and features of the invention will be set forth in detail with reference to the accompanying drawings such that those skilled in the art can easily practice the present invention. In describing the present invention, a detailed description of well-known technologies will be omitted if it is determined that such description can unnecessarily obscure the main points of the present invention. Hereinafter, embodiments of the present invention will be described in detail with reference to the accompanying drawings. Wherever possible, the same reference numbers will be used throughout the drawings to refer to the same or like parts. It should be understood that the present invention is not limited to the following embodiments, and that the embodiments are provided for illustrative purposes only. The scope of the invention should be defined only by the accompanying claims and equivalents thereof.

Figure 1:
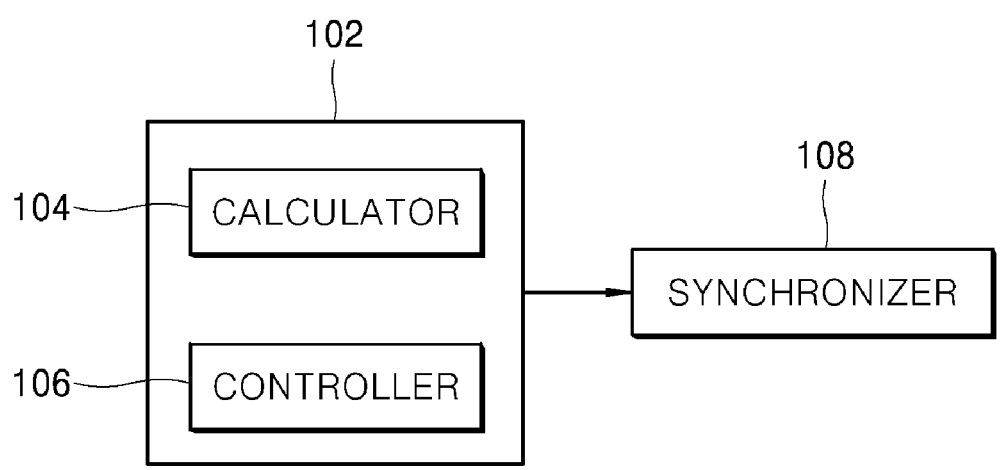
FIG. 1 is a block diagram illustrating a transmission control apparatus according to an embodiment of the present invention.

FIG. 1 is a block diagram illustrating a transmission control apparatus according to an embodiment of the present invention.

Referring to FIG. 1, a transmission control apparatus 102 according to an embodiment includes a calculator 104 and a controller 106. The calculator 104 determines a speed change mode of the vehicle and a target time corresponding to the speed change mode, and calculates a difference in speed between an input shaft and an output shaft with respect to the current time. In addition, the calculator 104 calculates a speed increment or decrement of the output shaft from the current time to a target time and calculates a synchronization torque using the difference in speed and the speed increment or decrement of the speed.

The controller 106 determines a target displacement of a synchronizer 108 using the synchronization torque calculated by the calculator 104, and controls the synchronizer 108 according to the determined target displacement to synchronize a sleeve and a clutch gear. In this embodiment, the controller 106 may detect a synchronization gradient between the sleeve and the clutch gear, determine a calibration value by comparing the detected synchronization gradient and the target gradient, and calibrate the target displacement of the synchronizer 108 by applying the determined calibration value to the target displacement.

In addition, according to the embodiment, the controller 106 may convert the determined target displacement into a target control position of an actuator for driving the synchronizer 108, and the actuator may be controlled according to the target control position to move the synchronizer 108 to the target displacement.

Figure 2:
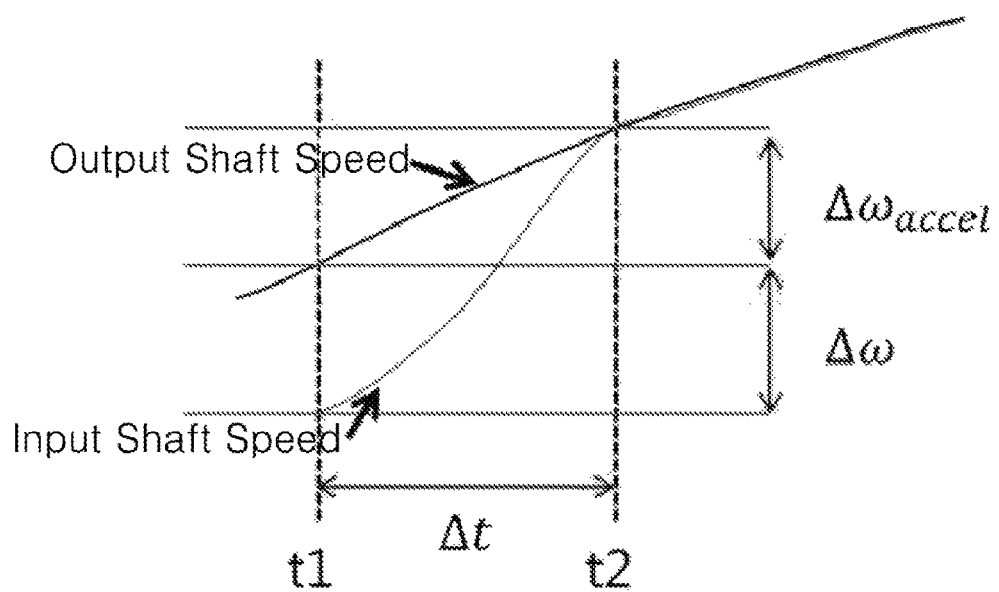
FIG. 2 illustrates control of a transmission in an acceleration situation according to an embodiment of the present invention.

Hereinafter, a method for controlling a transmission according to an embodiment of the present invention will be described in detail with reference to FIGS. 2 to 4.

Figure 3:
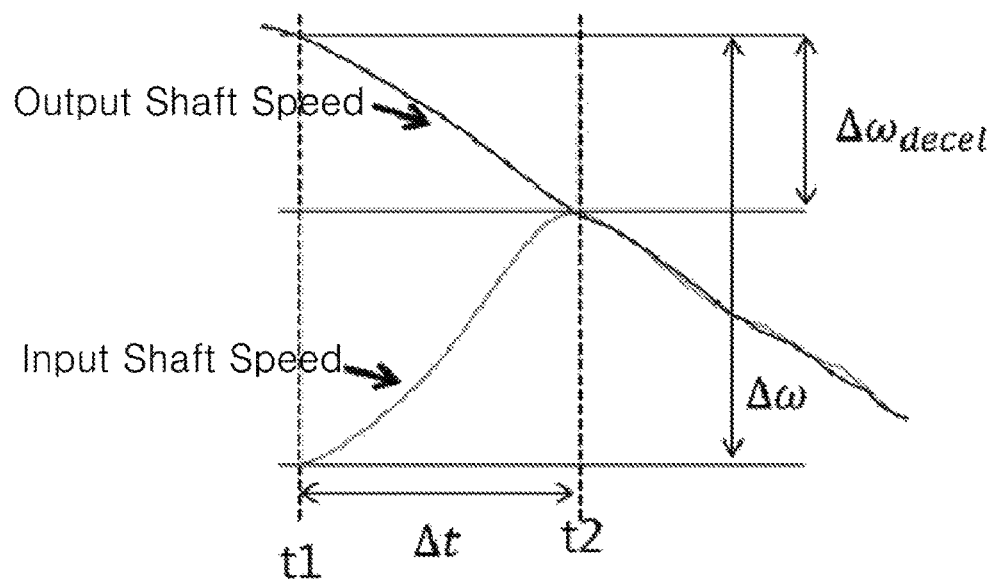
FIG. 3 illustrates control of a transmission in a deceleration situation according to an embodiment of the present invention.
Figure 4:
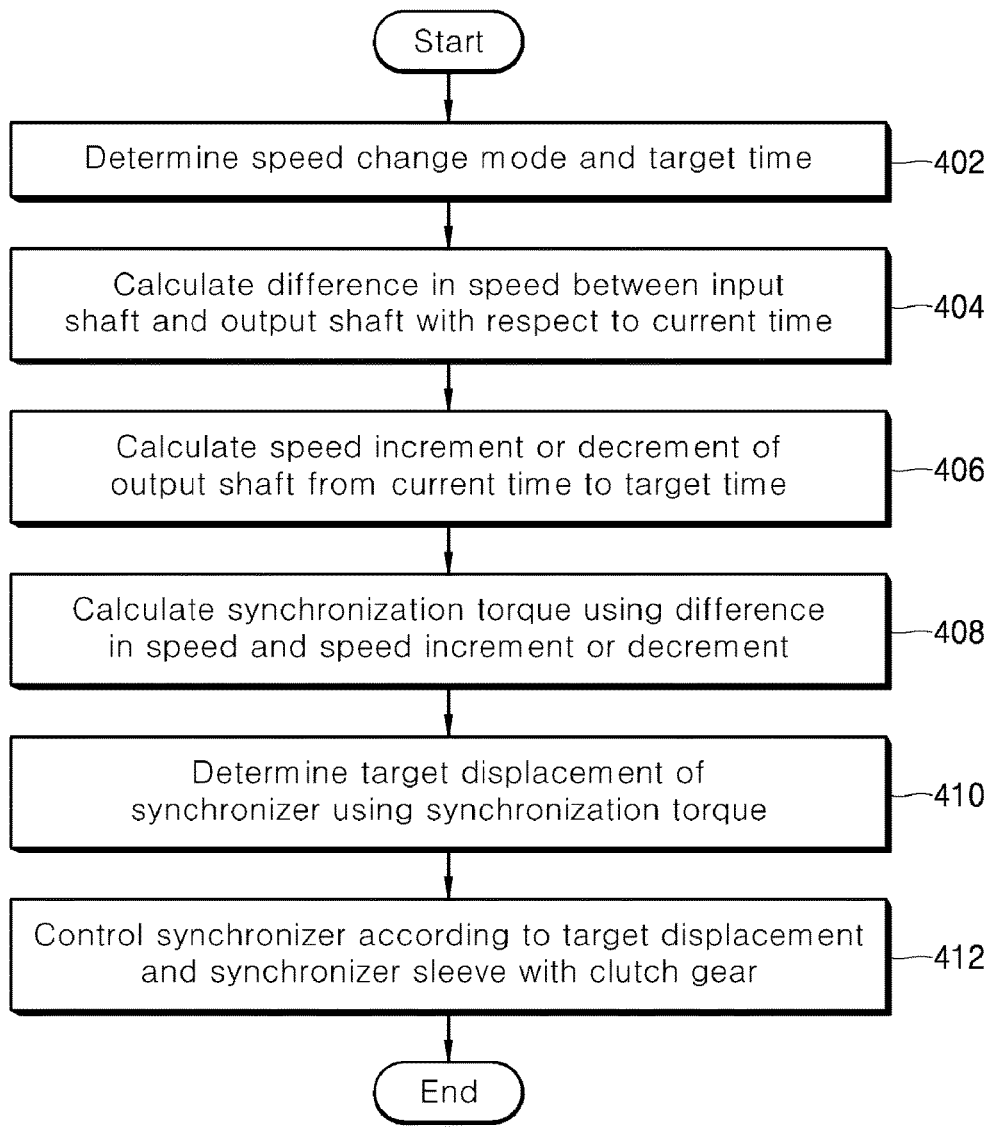
FIG. 4 is a flowchart illustrating a method for controlling a transmission according to an embodiment of the present invention.

Referring to FIG. 4, the calculator 104 determines a speed change mode according to a command for speed change from the driver (402). Herein, speed change modes are divided into an acceleration mode and a deceleration mode. FIG. 2 illustrates a process of speed change performed when the speed change mode is the acceleration mode, and FIG. 3 illustrates a process of speed change performed when the speed change mode is the deceleration mode. Thereafter, the calculator eight 104 determines a target time t2 according to the determined speed change mode (402).

Next, the calculator 104 calculates a difference in speed between an input shaft and an output shaft with respect to the current time t1 (404). For example, in FIGS. 2 and 3, the difference in speed between the input shaft and the output shaft with respect to the current time t1 is indicated by $\Delta\omega$.

Next, the calculator 104 calculates a speed increment or decrement (the amount of increase in speed or the amount of decrease in speed) of the output shaft from the current time t1 to the target time t2 (406). In FIG. 2, the speed increment of the output shaft from the current time t1 to the target time t2 is indicated by $\Delta\omega_{accel}$. In FIG. 3, the speed decrement of the output shaft from the current time t1 to the target time t2 is indicated by $\Delta\omega_{decel}$.

Next, the calculator 104 calculates a synchronization torque using the calculated speed difference $\Delta\omega$ and the speed increment or decrement ($\Delta\omega_{accel}$ or $\Delta\omega_{decel}$) (408). If the speed change mode is the acceleration mode as shown in FIG. 2, the synchronization torque may be calculated by Equation 1 given below.

$$T_{cone} = \frac{\Delta\omega + \Delta\omega_{accel}}{\Delta t} J_{eq,n} \qquad \text{Equation 1}$$

In Equation 1, $T_{cone}$ denotes the synchronization torque, $\Delta\omega$ denotes the difference in speed between the input shaft and the output shaft, $\Delta\omega_{accel}$ denotes the speed increment, $\Delta t$ denotes the difference between the target time t2 and the current time t1, and $J_{eq,n}$ denotes equivalent inertia for engagement of gear step n.

If the speed change mode is the acceleration mode as shown in FIG. 3, the synchronization torque may be calculated by Equation 2 given below.

$$T_{cone} = \frac{\Delta\omega - \Delta\omega_{decel}}{\Delta t} J_{eq,n} \qquad \text{Equation 2}$$

In Equation 2, $T_{cone}$ denotes the synchronization torque, $\Delta\omega$ denotes the difference in speed between the input shaft and the output shaft, $\Delta\omega_{decel}$ denotes a speed decrement, $\Delta t$ denotes the difference between the target time t2 and the current time t1, and $J_{eq,n}$ denotes equivalent inertia for engagement of gear step n.

The controller 106 determines a target displacement of the synchronizer 108 using the calculated synchronization torque (410). Then, the controller 106 synchronizes the sleeve and the clutch gear by controlling the synchronizer 108 according to the determined target displacement (412). In this operation, the controller 106 may convert the determined target displacement into a target control position of an actuator for driving the synchronizer 108, and move the synchronizer 108 to the target displacement by controlling the actuator according to the target control position.

Although not shown FIG. 4, the controller 106 may detect a synchronization gradient during synchronization between the sleeve and the clutch gear, and determine a calibration value by comparing the detected synchronization gradient and a target gradient. The controller 106 may calibrate the target displacement by applying the determined calibration value to the target displacement of the synchronizer 108.

Those skilled in the art will appreciate that various substitutions, modifications, variations can be made to the present invention without departing from the technical spirit of the invention and that the present invention is not limited to the embodiments described above and the accompanying drawings.

What is claimed is:

1. A method for controlling a transmission comprising:
   determining a speed change mode of a vehicle and a target time corresponding to the speed change mode;
   calculating a difference in speed between an input shaft and an output shaft with respect to a current time;
   calculating a speed increment or decrement of the output shaft from the current time to the target time;
   calculating a synchronization torque using the difference in speed and the speed increment or decrement;
   determining a target displacement of a synchronizer using the synchronization torque; and
   controlling the synchronizer according to the target displacement and recognizing a sleeve with a clutch gear.

2. The method according to claim 1, further comprising:
   detecting a synchronization gradient between the sleeve and the clutch gear;
   comparing the synchronization gradient and a target gradient and determining a calibration value; and
   applying the calibration value to the target displacement.

3. The method according to claim 1, wherein, when the speed change mode is an acceleration mode, the synchronization torque is determined by Equation 1:

$$T_{cone} = \frac{\Delta\omega + \Delta\omega_{accel}}{\Delta t} J_{eq,n}, \quad \text{Equation 1}$$

wherein $T_{cone}$ denotes the synchronization torque, $\Delta\omega$ denotes the difference in speed, $\Delta\omega_{accel}$ denotes the speed increment, $\Delta t$ denotes a difference between the target time and the current time t1, and $J_{eq,n}$ denotes equivalent inertia for engagement of gear step n.

4. The method according to claim 1, wherein, when the speed change mode is a deceleration mode, the synchronization torque is determined by Equation 2:

$$T_{cone} = \frac{\Delta\omega - \Delta\omega_{decel}}{\Delta t} J_{eq,n}, \quad \text{Equation 2}$$

wherein $T_{cone}$ denotes the synchronization torque, $\Delta\omega$ denotes the difference in speed, $\Delta\omega_{decel}$ denotes the speed decrement, $\Delta t$ denotes a difference between the target time and the current time t1, and $J_{eq,n}$ denotes equivalent inertia for engagement of gear step n.

5. The method according to claim 1, wherein the synchronizing comprises:
   converting the target displacement into a target control position of an actuator for driving the synchronizer; and
   controlling the actuator according to the target control position and moving the synchronizer to the target displacement.

6. An apparatus for controlling a transmission, the apparatus comprising:
   a calculator configured to determine a speed change mode of a vehicle and a target time corresponding to the speed change mode, calculate a difference in speed between an input shaft and an output shaft with respect to a current time, calculate a speed increment or decrement of the output shaft from the current time to the target time, and calculate a synchronization torque using the difference in speed and the speed increment or decrement; and
   a controller configured to determine a target displacement of a synchronizer using the synchronization torque, and control the synchronizer according to the target displacement and recognizing a sleeve with a clutch gear.

7. The apparatus according to claim 6, wherein the controller detects a synchronization gradient between the sleeve and the clutch gear, compares the synchronization gradient and a target gradient and determining a calibration value, and applies the calibration value to the target displacement.

8. The apparatus according to claim 6, wherein, when the speed change mode is an acceleration mode, the synchronization torque is determined by Equation 1:

$$T_{cone} = \frac{\Delta\omega + \Delta\omega_{accel}}{\Delta t} J_{eq,n}, \quad \text{Equation 1}$$

wherein $T_{cone}$ denotes the synchronization torque, $\Delta\omega$ denotes the difference in speed, $\Delta\omega_{accel}$ denotes the speed increment, $\Delta t$ denotes a difference between the target time and the current time t1, and $J_{eq,n}$ denotes equivalent inertia for engagement of gear step n.

9. The apparatus according to claim 6, wherein, when the speed change mode is a deceleration mode, the synchronization torque is determined by Equation 2:

$$T_{cone} = \frac{\Delta\omega - \Delta\omega_{decel}}{\Delta t} J_{eq,n}, \quad \text{Equation 2}$$

wherein $T_{cone}$ denotes the synchronization torque, $\Delta\omega$ denotes the difference in speed, $\Delta\omega_{decel}$ denotes the speed decrement, $\Delta t$ denotes a difference between the target time and the current time t1, and $J_{eq,n}$ denotes equivalent inertia for engagement of gear step n.

10. The apparatus according to claim 6, wherein the controller converts the target displacement into a target control position of an actuator for driving the synchronizer, and controls the actuator according to the target control position and moving the synchronizer to the target displacement.

* * * * *